(12) United States Patent
Yu

(10) Patent No.: US 10,070,318 B2
(45) Date of Patent: Sep. 4, 2018

(54) METHOD, APPARATUS AND SYSTEM AND STORAGE MEDIUM FOR RE-ESTABLISHING RADIO RESOURCE

(71) Applicant: Sanechips Technology Co.,Ltd., Shenzhen, Guangdong (CN)

(72) Inventor: Dongyan Yu, Shenzhen (CN)

(73) Assignee: Sanechips Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/502,613

(22) PCT Filed: Nov. 13, 2014

(86) PCT No.: PCT/CN2014/091022
§ 371 (c)(1),
(2) Date: Feb. 8, 2017

(87) PCT Pub. No.: WO2016/023286
PCT Pub. Date: Feb. 18, 2016

(65) Prior Publication Data
US 2017/0257771 A1  Sep. 7, 2017

(30) Foreign Application Priority Data

Aug. 15, 2014 (CN) .......................... 2014 1 045196

(51) Int. Cl.
*H04W 12/12* (2009.01)
*H04W 76/19* (2018.01)
(Continued)

(52) U.S. Cl.
CPC ......... *H04W 12/12* (2013.01); *H04L 43/0864* (2013.01); *H04W 12/08* (2013.01);
(Continued)

(58) Field of Classification Search
CPC ............. H04W 12/12; H04W 72/0446; H04W 72/0453; H04W 48/16; H04W 76/028;
(Continued)

(56) References Cited

U.S. PATENT DOCUMENTS 8,102,788 B2 * 1/2012 Zhang ................... H04L 1/0083
370/311
9,629,036 B2 * 4/2017 Kim .................. H04W 36/0055
(Continued)

FOREIGN PATENT DOCUMENTS

CN      102348191 A    2/2012
CN      102802115 A    11/2012
(Continued)

OTHER PUBLICATIONS

International Search Report in international application No. PCT/CN2014/091022, dated May 20, 2015, 2 pgs.
(Continued)

*Primary Examiner* — Brandon J Miller
(74) *Attorney, Agent, or Firm* — Cooper Legal Group, LLC

(57) ABSTRACT

The embodiments of the disclosure disclose a method, apparatus and system, and a storage medium for re-establishing radio resource(s). The method may include: when a terminal triggers re-establishing of the radio resource(s), a request indication message is sent by the terminal; the terminal receives a response message sent by a target evolved Node B; the terminal compares a second Packet Data Unit (PDU) number which is locally maintained with a first PDU number to acquire a difference value between the second PDU number and the first PDU number; and when the difference value does not exceed a preset threshold value, the terminal determines that the target evolved Node B is a legal evolved Node B, and the terminal implements
(Continued)

re-establishing of the radio resource(s) between the terminal and the target evolved Node B.

20 Claims, 3 Drawing Sheets

(51) Int. Cl.
*H04L 12/26* (2006.01)
*H04W 72/04* (2009.01)
*H04W 48/16* (2009.01)
*H04W 12/08* (2009.01)
*H04L 29/06* (2006.01)

(52) U.S. Cl.
CPC ....... *H04W 48/16* (2013.01); *H04W 72/0446* (2013.01); *H04W 72/0453* (2013.01); *H04W 76/19* (2018.02); *H04L 63/145* (2013.01)

(58) Field of Classification Search
CPC ... H04W 12/08; H04L 43/0864; H04L 63/145
See application file for complete search history.

(56) References Cited

U.S. PATENT DOCUMENTS

| 2002/0159444 | A1 | 10/2002 | Vialen |
| 2007/0094494 | A1* | 4/2007 | Banerjee ............ H04L 9/085 713/157 |
| 2008/0090549 | A1 | 4/2008 | Vialen |
| 2010/0095368 | A1* | 4/2010 | Niu .................. H04W 12/06 726/12 |
| 2011/0030035 | A1* | 2/2011 | Wu ................... H04L 63/107 726/4 |

FOREIGN PATENT DOCUMENTS

| CN | 103763690 A | 4/2014 |
| CN | 103782628 A | 5/2014 |
| CN | 103906116 A | 7/2014 |
| EP | 1169825 A1 | 1/2002 |
| KR | 20080050946 A | 6/2008 |
| KR | 100847145 B1 | 7/2008 |
| WO | 0163853 A1 | 8/2001 |

OTHER PUBLICATIONS

English Translation of the Written Opinion of the International Search Authority in international application No. PCT/CN2014/091022, dated May 20, 2015, 8 pgs.

Supplementary European Search Report in European application No. 14899636.6, dated Jun. 27, 2017, 9 pgs.

"3rd Generation Partnership Project; Technical Specification Group Services and System Aspects; 3GPP system Architecture Evolution(SAE); Security architecture (Release 12)", 3GPP Standard; 3GPP TS 33.401, 3rd Genaration Partnership Project (3GPP), Mobile Competence Centre; 650, Route Des Lucioles; F-06921 Sophia-Antipolis Cedex; France, vol. SA WG3, No. V12. 7.0, Mar. 15, 2013 (Mar. 15, 2013), 122 pgs.

* cited by examiner

METHOD, APPARATUS AND SYSTEM AND STORAGE MEDIUM FOR RE-ESTABLISHING RADIO RESOURCE

TECHNICAL FIELD

The disclosure relates to a network communication security technology, and more particularly to a method, apparatus and system, and a storage medium for re-establishing radio resource(s).

BACKGROUND

An Internet Protocol (IP) Multimedia Core Network Subsystem (IMS) is a next-generation network standard defined by the 3rd Generation Partnership Project (3GPP). The IMS may encapsulate a conventional voice service into an IP data packet for end-to-end transmission. An increasingly mature Long Term Evolution (LTE) technology, as a transmission link, may also acquire a relatively higher transmission rate and a relatively lower delay. Therefore, an LTE-system-based IMS service emerges.

At present, in an LTE-system-based IMS service, a large number of resources are required to be consumed for data encryption and decryption. Therefore, in a communication scenario with a low security requirement, such as a basic civil communication and a broadcast service, data of an air interface is transmitted without encryption, and there is no protection provided for a transmitted IP data packet.

Therefore, a terminal may easily access an illegal evolved Node B. As such the illegal evolved Node B may acquire private information of the terminal through a Dedicated Control Channel (DCCH), such as an International Mobile Subscriber Identification Number (IMSI) and International Mobile Apparatus Identity (IMEI) information of the terminal. Furthermore, the illegal evolved Node B may send risky downlink data to the terminal through a Dedicated Traffic Channel (DTCH), such as a junk short message, Trojan planting and permission tampering. Therefore, a risk of the IMS terminal in a re-establishing of the radio resource(s) process is increased.

SUMMARY

In order to solve the technical problem, embodiments of the disclosure are intended to provide a method, apparatus and system and a storage medium for re-establishing radio resource(s), which may reduce a risk of an IMS terminal in a process for re-establishing the radio resource(s).

The technical solutions of the disclosure are implemented as follows.

On a first aspect, the embodiments of the disclosure provide a method for re-establishing radio resource(s), which may include:

when a terminal triggers re-establishing of the radio resource(s), a request indication message is sent by the terminal, wherein the request indication message may be arranged to request for acquiring a first Packet Data Unit (PDU) number, which is recorded by a target evolved Node B until the request indication message is received, of PDUs which have been transmitted between the terminal and the target evolved Node B;

the terminal receives a response message sent by the target evolved Node B, wherein the response message may include the first PDU number;

the terminal compares a second PDU number, which is locally maintained, with the first PDU number to acquire a difference value between the second PDU number and the first PDU number; and when the difference value does not exceed a preset threshold value, the terminal determines that the target evolved Node B is a legal evolved Node B, and the terminal implements re-establishing of the radio resource(s) between the terminal and the target evolved Node B, wherein the second PDU number may be a second PDU number, which is recorded by the terminal until the response message is received, of PDUs which have been transmitted between the terminal and the target evolved Node B.

In an embodiment of the disclosure, the method may further include:

when the difference value between the second PDU number and the first PDU number is larger than the preset threshold value, the terminal determines that the target evolved Node B is an illegal evolved Node B, and the terminal does not search for a frequency point of a frequency band where the illegal evolved Node B is located for a preset time period.

In an embodiment of the disclosure, the first PDU number may include a first uplink PDU number and a first downlink PDU number, wherein the first uplink PDU number may be a number of PDUs, which have been transmitted by the terminal and have been received via at least one radio bearer between the target evolved Node B and the terminal, and the first downlink PDU number may be a number of PDUs which have been sent to the terminal via the at least one radio bearer between the target evolved Node B and the terminal.

The second PDU number may include a second uplink PDU number and a second downlink PDU number, wherein the second uplink PDU number may be a number of PDUs which have been sent to the target evolved Node B via the at least one radio bearer between the terminal and the target evolved Node B, and the second downlink PDU number may be a number of PDUs which have been received via the at least one radio bearer between the terminal and the target evolved Node B and are transmitted by the target evolved Node B.

In an embodiment of the disclosure, the difference value between the second PDU number and the first PDU number may include:

a difference value between the second downlink PDU number and the first downlink PDU number, and/or a difference value between the second uplink PDU number and the first uplink PDU number.

Furthermore, the preset threshold value may be a product of a data transmission rate V when the terminal transmits the request indication message and a time period $\Delta T$ from time when the request indication message is sent by the terminal to time when the response message is received by the terminal.

On a second aspect, the embodiments of the disclosure provide a method for re-establishing radio resource(s), which may include:

a target evolved Node B receives a request indication message sent by a terminal, wherein the request indication request may be configured for the terminal to request for acquiring a first PDU number, which is recorded by the target evolved Node B until the request indication message is received, of PDUs which have been transmitted between the terminal and the target evolved Node B;

the target evolved Node B acquires the first PDU number recorded until the request indication message is received according to the request indication message; and the target evolved Node B sends a response message to the terminal, wherein the response message may include the first PDU number, and the first PDU number may be configured for the terminal to determine legality of the target evolved Node B.

In an embodiment of the disclosure, the first PDU number may include a first uplink PDU number and a first downlink PDU number, wherein the first uplink PDU number may be a number of PDUs, which have been transmitted by the terminal and have been received via at least one radio bearer between the target evolved Node B and the terminal, and the first downlink PDU number may be a number of PDUs which have been sent to the terminal via the at least one radio bearer between the target evolved Node B and the terminal.

On a third aspect, the embodiments of the disclosure provide a terminal, which may include a sending unit, a receiving unit, a comparison unit and a determination unit.

The sending unit may be arranged to, when the terminal triggers re-establishing of the radio resource(s), send a request indication message, wherein the request indication message may be arranged to request for acquiring a first PDU number, which is recorded by a target evolved Node B until the request indication message is received, of PDUs which have been transmitted between the terminal and the target evolved Node B.

The receiving unit may be arranged to receive a response message sent by the target evolved Node B, wherein the response message may include the first PDU number.

The comparison unit may be arranged to compare a second PDU number, which is locally maintained, with the first PDU number received by the receiving unit to acquire a difference value between the second PDU number and the first PDU number, and transmit the difference value to the determination unit.

The determination unit may be arranged to, when the difference value does not exceed a preset threshold value, determine that the target evolved Node B is a legal evolved Node B, and implement re-establishing of the radio resource(s) between the terminal and the target evolved Node B, wherein the second PDU number may be a second PDU number, which is recorded by the terminal until the response message is received, of PDUs which have been transmitted between the terminal and the target evolved Node B.

In an embodiment of the disclosure, the determination unit may further be arranged to, when the difference value is larger than the preset threshold value, determine that the target evolved Node B is an illegal evolved Node B, and not search for a frequency point of a frequency band where the illegal evolved Node B is located for a preset time period.

In an embodiment of the disclosure, the first PDU number may include a first uplink PDU number and a first downlink PDU number, wherein the first uplink PDU number may be a number of PDUs, which have been transmitted by the terminal and have been received via at least one radio bearer between the target evolved Node B and the terminal, and the first downlink PDU number may be a number of PDUs which have been sent to the terminal via the at least one radio bearer between the target evolved Node B and the terminal.

In the embodiment of the disclosure, the second PDU number may include a second uplink PDU number and a second downlink PDU number, wherein the second uplink PDU number may be a number of PDUs which have been sent to the target evolved Node B via the at least one radio bearer between the terminal and the target evolved Node B, and the second downlink PDU number may be a number of PDUs which have been transmitted by the target evolved Node B and have been received via the at least one radio bearer between the terminal and the target evolved Node B.

In an embodiment of the disclosure, the difference value between the second PDU number and the first PDU number may include: a difference value between the second downlink PDU number and the first downlink PDU number, and/or a difference value between the second uplink PDU number and the first uplink PDU number.

In an embodiment of the disclosure, the preset threshold value may be a product of a data transmission rate V when the sending unit sends the request indication message and a time period $\Delta T$ from time when the request indication message is sent by the sending unit to time when the response message is received by the receiving unit.

On a fourth aspect, the embodiments of the disclosure provide a target evolved Node B, which may include: a receiving module, an acquisition module and a sending module.

The receiving module may be arranged to receive a request indication message sent by a terminal, wherein the request indication request may be configured for the terminal to request for acquiring a first PDU number, which is recorded by the target evolved Node B until the request indication message is received, of PDUs which have been transmitted between the terminal and the target evolved Node B.

The acquisition module may be arranged to acquire the first PDU number recorded until the request indication message is received according to the request indication message.

The sending module may be arranged to send a response message to the terminal, wherein the response message may include the first PDU number, and the first PDU number may be configured for the terminal to determine legality of the target evolved Node B.

Furthermore, the first PDU number may include a first uplink PDU number and a first downlink PDU number, wherein the first uplink PDU number may be a number of PDUs, which have been transmitted by the terminal and have been received via at least one radio bearer between the target evolved Node B and the terminal, and the first downlink PDU number may be a number of PDUs which have been sent to the terminal via the at least one radio bearer between the target evolved Node B and the terminal.

On a fifth aspect, the embodiments of the disclosure provide a system for re-establishing the radio resource(s), which may include a terminal and a target evolved Node B.

The terminal may be arranged to, when triggering re-establishing of the radio resource(s), send a request indication message, wherein the request indication message may be arranged to request for acquiring a first PDU number, which is recorded by the target evolved Node B until the request indication message is received, of PDUs which have been transmitted between the terminal and the target evolved Node B.

The terminal may be arranged to receive a response message sent by the target evolved Node B, wherein the response message may include the first PDU number.

The terminal may be arranged to compare a second PDU number, which is locally maintained, with the first PDU number. When the difference value does not exceed a preset threshold value, the terminal may determine that the target evolved Node B is a legal evolved Node B, and the terminal may implement re-establishing of the radio resource(s) between the terminal and the target evolved Node B. The second PDU number may be a second PDU number, which is recorded by the terminal until the response message is received, of PDUs which have been transmitted between the terminal and the target evolved Node B.

The target evolved Node B may be arranged to receive the request indication message sent by the terminal, wherein the request indication request may be configured for the terminal to request for acquiring the first PDU number, which is recorded by the target evolved Node B until the request indication message is received, of the PDUs which have been transmitted between the terminal and the target evolved Node B.

The target evolved Node B may be arranged to acquire the first PDU number according to the request indication message.

The target evolved Node B may be arranged to send the response message to the terminal, wherein the response message may include the first PDU number, and the first PDU number may be configured for the terminal to determine legality of the target evolved Node B.

On a sixth aspect, the embodiment of the disclosure provides a computer storage medium having stored computer-executable instructions for executing the method for re-establishing radio resource(s) mentioned in the first aspect or executing the method for re-establishing radio resource(s) mentioned in the second aspect.

The embodiment of the disclosure provides the method, apparatus and system, and the storage medium for re-establishing radio resource(s). The terminal compares, in a process for re-establishing the radio resource(s), historical records when the terminal processes a service and historical records when the evolved Node B processes a service corresponding to the service processed by the terminal, thereby determining the legality of the evolved Node B which performs re-establishing of the radio resource(s) with the terminal. Not only may resource consumption in encryption and decryption of transmitted data be avoided, but also security of the IMS terminal in the process for re-establishing the radio resource(s) is improved.

DETAILED DESCRIPTION

The technical solutions in the embodiment of the disclosure will be clearly and completely described below with reference to the drawings in the embodiment of the disclosure.

Figure 1:
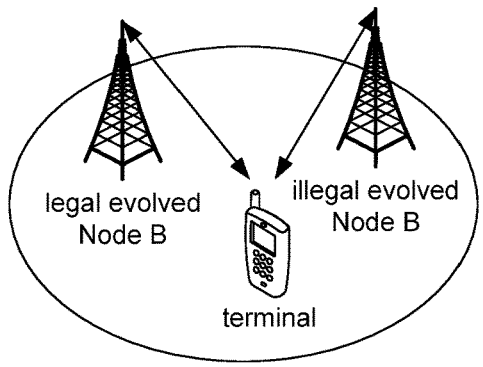
FIG. 1 is a schematic diagram of an exemplary application scenario according to an embodiment of the disclosure.

FIG. 1 is an exemplary application scenario according to the embodiment of the disclosure. It can be understood that the application scenario is only adopted to describe the technical solutions provided by the embodiment of the disclosure and not intended to form any limit to the embodiment of the disclosure. Those skilled in the art may apply the technical solutions of the embodiment of the disclosure to other scenarios without creative work. In the application scenario shown in FIG. 1, a legal IMS evolved Node B is connected with a terminal through an LTE link. In case of interference to the terminal or uplink synchronization loss caused by an abnormality of the LTE link, the terminal is required to reconstruct a radio resource link. At this moment, the terminal may re-search for an evolved Node B. An illegal evolved Node B has a communication frequency the same as the legal evolved Node B and the transmitted power of the illegal evolved Node B is higher than the transmitted power the legal evolved Node B. Thus, the terminal may search for the evolved Node B by taking a received signal strength indicator into account in a reconstruction process. Therefore, the terminal is very likely not to perform re-establishing of the radio resource(s) between the terminal and a legal evolved Node B, but to perform re-establishing of the radio resource(s) between the terminal and an illegal evolved Node B. Accordingly, a risk of the terminal in the re-establishing of the radio resource(s) process is increased.

A basic idea of the embodiments of the disclosure is that, in a process for re-establishing the radio resource(s), a terminal compares historical records when the terminal processes a service and historical records when an evolved Node B processes a service corresponding to the service processed by the terminal, thereby determining security of the evolved Node B which performs re-establishing of the radio resource(s) with the terminal. In such a manner, not only may security of the terminal in the process for re-establishing of the radio resource(s) be improved, but also resource consumption caused by use of an encryption and decryption algorithm in the reconstruction process is avoided.

Figure 2:
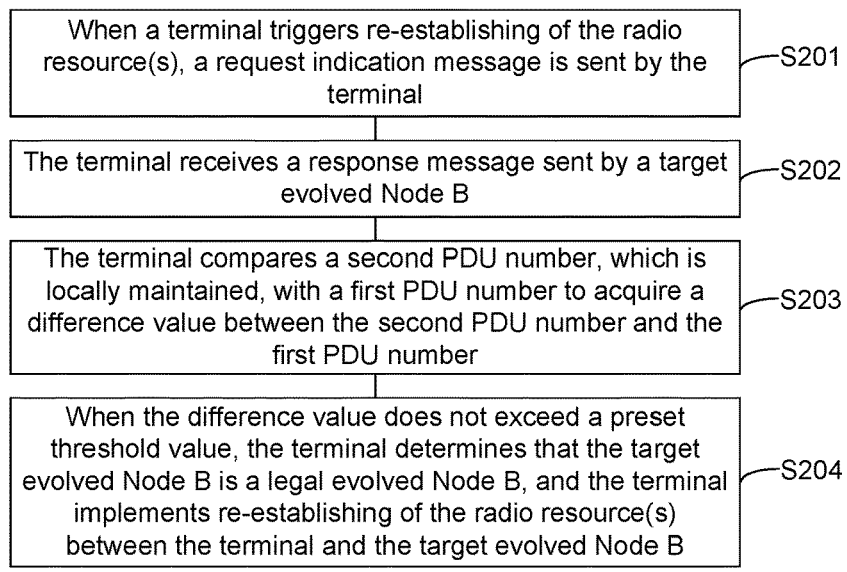
FIG. 2 is a flowchart of a method for re-establishing radio resource(s) according to an embodiment of the disclosure.

Referring to FIG. 2, a flow of a method for re-establishing radio resource(s) provided by the embodiments of the disclosure is shown. The method may be applied to a terminal. The terminal may be for example, but not limited to, intelligent mobile apparatus with a communication function, such as an intelligent mobile phone, a tablet computer, a palm computer, a portable laptop computer and wearable electronic apparatus. The method may include the following steps.

In step S201, when the terminal triggers re-establishing of the radio resource(s), a request indication message is sent.

For example, when the terminal has a communication failure with a legal evolved Node B connected before, the terminal is required to perform re-establishing of the radio resource(s) with a legal evolved Node B. In the embodiment, when the terminal finds a target evolved Node B and initiates re-establishing of the radio resource(s) to the found target evolved Node B, the request indication message may be encapsulated in uplink Radio Resource Control (RRC) Reestablish Request signalling transmitted to the target evolved Node B.

The request indication message may be arranged to request for acquiring a first PDU number, which is recorded by the target evolved Node B until the request indication message is received, of PDUs which have been transmitted between the terminal and the target evolved Node B.

In step S202, the terminal receives a response message sent by the target evolved Node B.

The response message includes the first PDU number. In the embodiment, the response message may be encapsulated in RRC Reestablish Setup signalling sent by the target evolved Node B.

It is also to be noted that the first PDU number includes a first uplink PDU number and a first downlink PDU number. The first uplink PDU number is a number of PDUs, which have been transmitted by the terminal and have been received via at least one radio bearer between the target evolved Node B and the terminal. The first downlink PDU number is a number of PDUs, which have been transmitted to the terminal via the at least one radio bearer between the target evolved Node B and the terminal.

In step S203, the terminal compares a second PDU number, which is locally maintained, with the first PDU number to acquire a difference value between the second PDU number and the first PDU number.

For example, the second PDU number is a second PDU number, which is recorded by the terminal until the response message is received, of PDUs which have been transmitted between the terminal and the target evolved Node B.

Optionally, the second PDU number includes a second uplink PDU number and a second downlink PDU number. The second uplink PDU number is a number of PDUs, which have been transmitted to the target evolved Node B via the at least one radio bearer between the terminal and the target evolved Node B. The second downlink PDU number is a number of PDUs, which have been transmitted by the target evolved Node B and have been received via the at least one radio bearer between the terminal and the target evolved Node B.

Optionally, the difference value between the second PDU number and the first PDU number includes: a difference value between the second downlink PDU number and the first downlink PDU number, and/or a difference value between the second uplink PDU number and the first uplink PDU number.

In step S204, when the difference value does not exceed a preset threshold value, the terminal determines that the target evolved Node B is a legal evolved Node B, and the terminal implements re-establishing of the radio resource(s) between the terminal and the target evolved Node B.

Optionally, the preset threshold value is a product of a data transmission rate V when the terminal transmits the request indication message and a time period $\Delta T$ from time when the request indication message is sent by the terminal to time when the response message is received by the terminal.

For example, after the terminal determines that the target evolved Node B is a legal evolved Node B, the terminal may send RRC Reestablish Setup Complete signalling to the target evolved Node B to implement re-establishing of the radio resource(s) between the terminal and the target evolved Node B.

It is to be noted that, when the difference value is larger than the preset threshold value, the terminal determines that the target evolved Node B is an illegal evolved Node B, and the terminal does not search for a frequency point of a frequency band where the illegal evolved Node B is located for a preset time period.

The embodiment of the disclosure provides the method for re-establishing radio resource(s). The terminal compares, in a process for re-establishing the radio resource(s), historical records when the terminal processes a service and historical records when the evolved Node B process a service corresponding to the service processed by the terminal, thereby determining security of the evolved Node B which performs re-establishing of the radio resource(s) with the terminal. In such a manner, not only may security of the terminal in the process for re-establishing the radio resource(s) be improved, but also resource consumption caused by use of an encryption and decryption algorithm in the reconstruction process is avoided.

Figure 3:
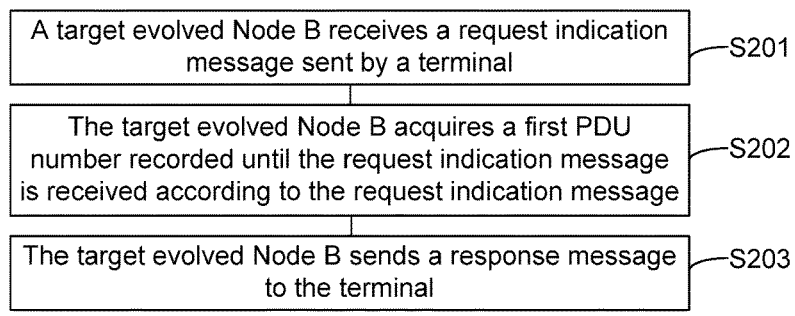
FIG. 3 is a flowchart of another method for re-establishing radio resource(s) according to an embodiment of the disclosure.

Referring to FIG. 3, a flow of another method for re-establishing radio resource(s) provided by the embodiments of the disclosure is shown. The method may be applied to a target evolved Node B to which a terminal initiates re-establishing of the radio resource(s). The method may include the following steps.

In step S301, the target evolved Node B receives a request indication message sent by the terminal.

The request indication request is configured for the terminal to request for acquiring a first PDU number, which is recorded by the target evolved Node B until the request indication message is received, of PDUs which have been transmitted between the terminal and the target evolved Node B.

Specifically, in the embodiment, the request indication message may be encapsulated in uplink RRC Reestablish Request signalling transmitted to the target evolved Node B from the terminal.

In step S302, the target evolved Node B acquires the first PDU number recorded until the request indication message is received according to the request indication message.

For example, the first PDU number includes a first uplink PDU number and a first downlink PDU number. The first uplink PDU number is a number of PDUs, which have been transmitted by the terminal and have been received via at least one radio bearer between the target evolved Node B and the terminal. The first downlink PDU number is a number of PDUs, which have been transmitted to the terminal via the at least one radio bearer between the target evolved Node B and the terminal.

In step S303, the target evolved Node B sends a response message to the terminal.

For example, the response message includes the first PDU number. The first PDU number is configured for the terminal to determine legality of the target evolved Node B.

Specifically, in the embodiment, the response message may be encapsulated in RRC Reestablish Setup signalling sent to the terminal by the target evolved Node B.

The embodiment of the disclosure provides the other method for re-establishing radio resource(s). The terminal compares, in a process for re-establishing the radio resource(s), historical records when the terminal process a service and historical records when the evolved Node B processes a service corresponding to the service processed by the terminal, thereby determining security of the evolved Node B which performs re-establishing of the radio resource(s) with the terminal. In such a manner, not only may security of the terminal in the process for re-establishing the radio resource(s) be improved, but also resource consumption caused by use of an encryption and decryption algorithm in the reconstruction process is avoided.

Figure 4:
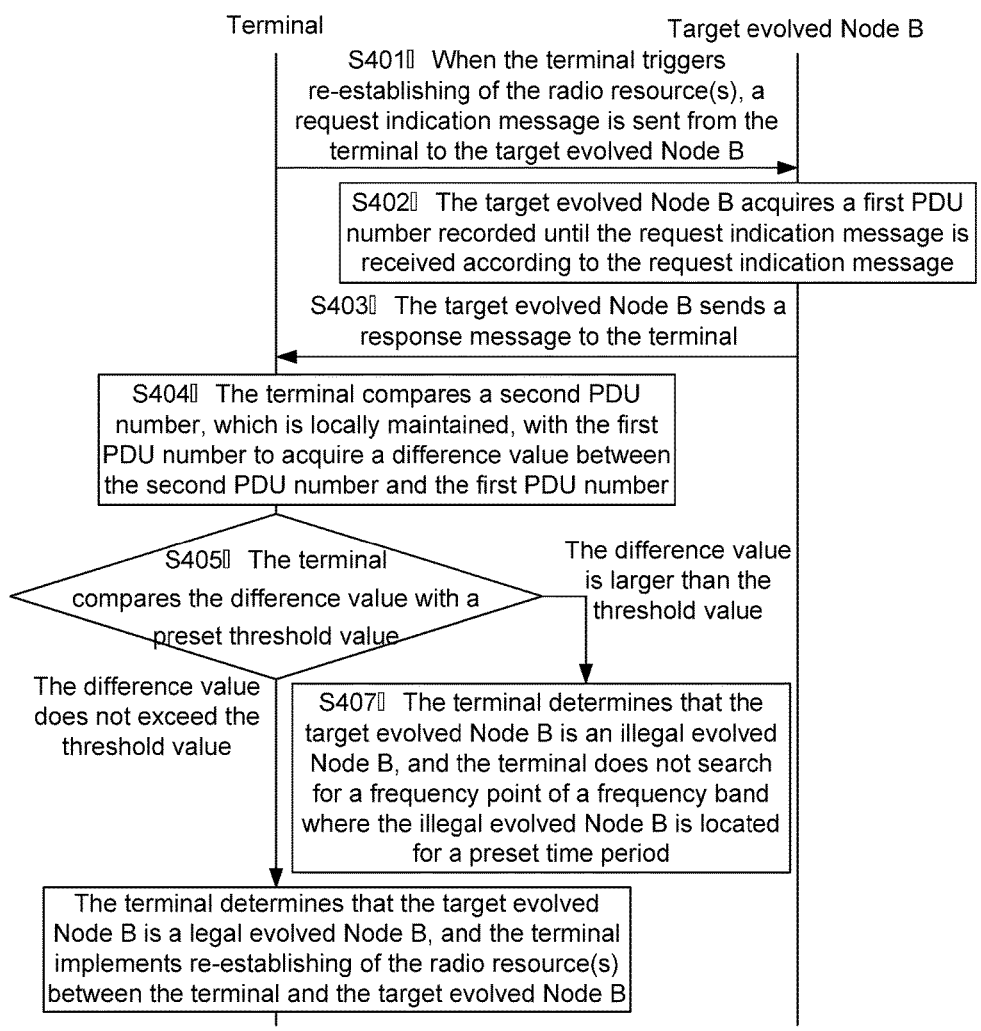
FIG. 4 is a detailed flowchart of a method for re-establishing radio resource(s) according to an embodiment of the disclosure.

Referring to FIG. 4, a detailed flow of a method for re-establishing radio resource(s) provided by the embodiments of the disclosure is shown. The method may include the following steps.

In step S401, when a terminal triggers re-establishing of the radio resource(s), a request indication message is sent to a target evolved Node B by the terminal.

For example, the request indication message may be arranged to request for acquiring a first PDU number, which is recorded by the target evolved Node B until the request indication message is received, of PDUs which have been transmitted between the terminal and the target evolved Node B.

Specifically, in the embodiment, the request indication message may be encapsulated in uplink RRC Reestablish Request signalling transmitted to the target evolved Node B by the terminal.

In step S402, the target evolved Node B acquires the first PDU number recorded until the request indication message is received according to the request indication message.

For example, the first PDU number includes a first uplink PDU number and a first downlink PDU number. The first uplink PDU number is a number of PDUs, which have been transmitted by the terminal and have been received via at least one radio bearer between the target evolved Node B and the terminal. The first downlink PDU number is a number of PDUs, which have been transmitted to the terminal via the at least one radio bearer between the target evolved Node B and the terminal.

Specifically, the first uplink PDU number may be recorded by a Packet Data Convergence Protocol (PDCP) layer of the target evolved Node B.

In the embodiment, a specific recording method adopted for the first PDU number by the target evolved Node B may be implemented as follows.

After the target evolved Node B receives a PDU sent by the terminal in an uplink via an ith radio bearer, the first uplink PDU number UL_COUNT_i is automatically increased by 1. The PDU is constituted of UL_SN_i and DATA. After the target evolved Node B sends a PDU constituted of DL_SN_i and DATA to the terminal on the ith radio bearer, the first downlink PDU number DL_COUNT_i is automatically increased by 1, where i is a serial number of the radio bearer, and is a positive integer not more than a number of radio bearers.

In step S403, the target evolved Node B sends a response message to the terminal.

Specifically, the response message includes the first PDU number. In the embodiment, the response message may be encapsulated in RRC Reestablish Setup signalling sent to the terminal by the target evolved Node B.

In step S404, the terminal compares a second PDU number, which is locally maintained, with the first PDU number to acquire a difference value between the second PDU number and the first PDU number.

For example, the second PDU number which is locally maintained by the terminal is a second PDU number, which is recorded by the terminal until the response message is received, of PDUs which have been transmitted between the terminal and the target evolved Node B.

Specifically, in the embodiment, a method for the terminal to maintain the second PDU number is the same as the specific recording method adopted for the first PDU number by the target evolved Node B, and will not be elaborated herein.

It can be understood that the first PDU number is arranged to reflect historical records of data transmission between the target evolved Node B and the terminal from the perspective of the target evolved Node B. Accordingly, the second PDU number is arranged to reflect historical records of data transmission between the terminal and the target evolved Node B from the perspective of the terminal. It can be known that, if the target evolved Node B is a legal evolved Node B which was connected with the terminal before the re-establish of the radio resource(s) is performed by the terminal, the historical records reflected by the first PDU number should be the same as the historical records reflected by the second PDU number. If the historical records reflected by the first PDU number are different from the historical records reflected by the second PDU number, it is indicated that the target evolved Node B is not the legal evolved Node B which was connected with the terminal before the re-establish of the radio resource(s) is performed by the terminal.

Therefore, the difference value, obtained according to comparison in step S404, between the second PDU number and the first PDU number may objectively reflect whether the target evolved Node B is legal or not.

For example, the difference value between the second PDU number and the first PDU number may include: a difference value between the second downlink PDU number and the first downlink PDU number, and/or a difference value between the second uplink PDU number and the first uplink PDU number.

Theoretically, the first PDU number should be the same as the second PDU number. However, the target evolved Node B may stop recording the first PDU number when the request indication message is received, and the terminal may stop recording the second PDU number when the response message is received. Thus, the first PDU number and the second PDU number are actually unequal. In the embodiment, legality of the target evolved Node B may be detected by using the difference value caused by a difference between the first PDU number and the second PDU number, specifically as follows.

In step S405, the terminal compares the difference value with a preset threshold value.

For example, the preset threshold value may be a product of a data transmission rate V when the sending unit sends the request indication message and a time period $\Delta T$ from time when the request indication message is sent by the sending unit to time when the response message is received by the receiving unit. This is because, if the target evolved Node B is a legal evolved Node B, the difference value between the first PDU number and the second PDU number will not exceed a total data transmission amount between the target evolved Node B and the terminal within a time period between time when recording of the first PDU number is stopped by the target evolved Node B and time when recording of the second PDU number is stopped by the terminal.

In step S406, when the difference value does not exceed the preset threshold value, the terminal determines that the target evolved Node B is a legal evolved Node B, and the terminal implements re-establishing of the radio resource(s) between the terminal and the target evolved Node B.

In step S407, when the difference value is larger than the preset threshold value, the terminal determines that the target evolved Node B is an illegal evolved Node B, and the terminal does not search for a frequency point of a frequency band where the illegal evolved Node B is located for a preset time period.

Specifically, in step S406, after determining that the target evolved Node B is a legal evolved Node B and implementing re-establishing of the radio resource(s) between the terminal and the legal evolved Node B, the terminal may further reset and re-record the second PDU number which is maintained.

Specifically, in step S407, after determining that the target evolved Node B is an illegal evolved Node B and not searching for the frequency point of the frequency band where the illegal evolved Node B is located for the preset time period, the terminal may further re-search for an evolved Node B in another frequency band or another system and neglect interference of the illegal evolved Node B.

The embodiment of the disclosure provides the method for re-establishing radio resource(s). The terminal compares, in a process for re-establishing the radio resource(s), the historical records when the terminal processes a service and the historical records when the evolved Node B processes a service corresponding to the service processed by the terminal, thereby determining security of the evolved Node B which performs re-establishing of the radio resource(s) with the terminal. In such a manner, not only may security of the terminal in the process for re-establishing the radio resource(s) be improved, but also resource consumption caused by use of an encryption and decryption algorithm in the reconstruction process is avoided.

Figure 5:
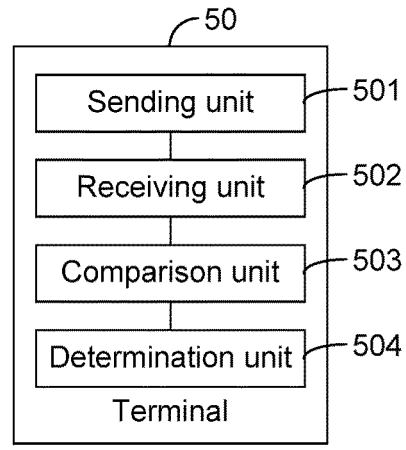
FIG. 5 is a structure diagram of a terminal according to an embodiment of the disclosure.

Based on the same technical concept of the abovementioned embodiment, referring to FIG. 5, a structure of a terminal 50 provided by the embodiment of the disclosure is shown. The terminal 50 may include a sending unit 501, a receiving unit 502, a comparison unit 503 and a determination unit 504.

The sending unit 501 is arranged to, when the terminal 50 triggers re-establishing of the radio resource(s), send a request indication message. The request indication message is arranged to request for acquiring a first PDU number, which is recorded by a target evolved Node B until the request indication message is received, of PDUs which have been transmitted between the terminal 50 and the target evolved Node B.

The receiving unit 502 is arranged to receive a response message sent by the target evolved Node B. The response message carries the first PDU number.

The comparison unit 503 is arranged to compare a second PDU number, which is locally maintained, with the first PDU number received by the receiving unit 502 to acquire a difference value between the second PDU number and the first PDU number, and transmit the difference value to the determination unit 504.

The determination unit 504 is arranged to, when the difference value does not exceed a preset threshold value, determine that the target evolved Node B is a legal evolved Node B, and implement re-establishing of the radio resource(s) between the terminal and the target evolved Node B. The second PDU number is a second PDU number, which is recorded by the terminal 50 until the response message is received, of PDUs which have been transmitted between the terminal and the target evolved Node B.

For example, the determination unit 504 is further arranged to, when the difference value is larger than the preset threshold value, determine that the target evolved Node B is an illegal evolved Node B, and not search for a frequency point of a frequency band where the illegal evolved Node B is located for a preset time period.

Preferably, the first PDU number includes a first uplink PDU number and a first downlink PDU number. The first uplink PDU number is a number of PDUs which have been transmitted by the terminal 50 and have been received via at least one radio bearer between the target evolved Node B and the terminal 50. The first downlink PDU number is a number of PDUs which have been sent to the terminal 50 via the at least one radio bearer between the target evolved Node B and the terminal 50.

The second PDU number includes a second uplink PDU number and a second downlink PDU number. The second uplink PDU number is a number of PDUs which have been sent to the target evolved Node B via the at least one radio bearer between the terminal 50 and the target evolved Node B. The second downlink PDU number is a number of PDUs which have been transmitted by the target evolved Node B and have been received via the at least one radio bearer between the terminal 50 and the target evolved Node B.

Preferably, the difference value between the second PDU number and the first PDU number includes: a difference value between the second downlink PDU number and the first downlink PDU number, and/or a difference value between the second uplink PDU number and the first uplink PDU number.

Preferably, the preset threshold value is a product of a data transmission rate V when the sending unit 501 sends the request indication message and a time period ΔT from time when the request indication message is sent by the sending unit 501 to time when the response message is received by the receiving unit 502.

The embodiment provides the terminal 50. The terminal 50 compares, in a process for re-establishing the radio resource(s), historical records when the terminal processes a service and historical records when the evolved Node B process a service corresponding to the service processed by the terminal, thereby determining legality of the evolved Node B which performs re-establishing of the radio resource(s) with the terminal. Not only may resource consumption in encryption and decryption of transmitted data be avoided, but also security of the IMS terminal in the process for re-establishing the radio resource(s) is improved.

Figure 6:
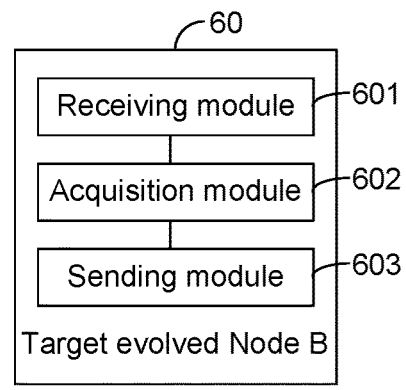
FIG. 6 is a structure diagram of a target evolved Node B according to an embodiment of the disclosure.

Based on the technical concept which is same as the technical concept of the abovementioned embodiment, referring to FIG. 6, a structure of a target evolved Node B 60 provided by the embodiments of the disclosure is shown. The target evolved Node B 60 may include: a receiving module 601, an acquisition module 602 and a sending module 603.

The receiving module 601 is arranged to receive a request indication message sent by a terminal. The request indication request is configured for the terminal to request for acquiring a first PDU number, which is recorded by the target evolved Node B 60 until the request indication message is received, of PDUs which have been transmitted between the terminal and the target evolved Node B 60.

The acquisition module 602 is arranged to acquire the first PDU number recorded until the request indication message is received according to the request indication message.

The sending module 603 is arranged to send a response message to the terminal. The response message includes the first PDU number. The first PDU number may be configured for the terminal to determine legality of the target evolved Node B 60.

Preferably, the first PDU number includes a first uplink PDU number and a first downlink PDU number. The first uplink PDU number is a number of PDUs which have been transmitted by the terminal and have been received via at least one radio bearer between the target evolved Node B 60 and the terminal. The first downlink PDU number is a number of PDUs which have been sent to the terminal via the at least one radio bearer between the target evolved Node B 60 and the terminal.

The embodiment provides the target evolved Node B 60. In a process for re-establishing the radio resource(s), the terminal compares historical records when the terminal processes a service and historical records when the evolved Node B 60 processes a service corresponding to the service processed by the terminal, thereby determining legality of the target evolved Node B 60 which performs re-establishing of the radio resource(s) with the terminal. Not only may resource consumption in encryption and decryption of transmitted data be avoided, but also security of the IMS terminal in the process for re-establishing the radio resource(s) is improved.

Figure 7:
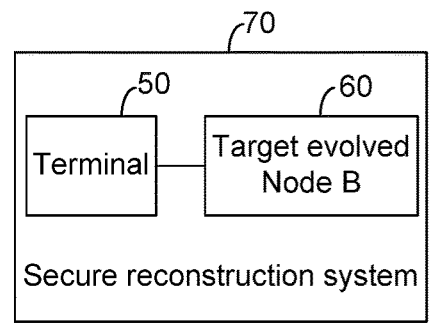
FIG. 7 is a structure diagram of a system for re-establishing the radio resource(s) according to an embodiment of the disclosure.

Based on the technical concept which is the same as the technical concept of the abovementioned embodiment, referring to FIG. 7, a structure of a system 70 for re-establishing the radio resource(s) provided by the embodiments of the disclosure is shown. The system may include: a terminal 50 and a target evolved Node B 60.

The terminal 50 is arranged to, when triggering re-establishing of the radio resource(s), send a request indication message. The request indication message is arranged to request for acquiring a first PDU number, which is recorded by the target evolved Node B 60 until the request indication message is received, of PDUs which have been transmitted between the terminal 50 and the target evolved Node B 60.

The terminal 50 is arranged to receive a response message sent by the target evolved Node B 60. The response message includes the first PDU number.

The terminal 50 is arranged to compare a second PDU number, which is locally maintained, with the first PDU number. When the difference value between the second PDU number and the first PDU number does not exceed a preset threshold value, the terminal 50 determines that the target evolved Node B 60 is a legal evolved Node B, and the terminal 50 implements re-establishing of the radio resource(s) between the terminal and the target evolved Node B 60. The second PDU number is a second PDU number, which is recorded by the terminal 50 until the response message is received, of PDUs which have been transmitted between the terminal and the target evolved Node B 60.

The target evolved Node B 60 is arranged to receive the request indication message sent by the terminal 50. The request indication request is configured for the terminal 50 to request for acquiring the first PDU number, which is recorded by the target evolved Node B 60 until the request indication message is received, of the PDUs which have been transmitted between the terminal 50 and the target evolved Node B 60.

The target evolved Node B 60 is arranged to acquire the first PDU number according to the request indication message.

The target evolved Node B 60 is arranged to send the response message to the terminal 50. The response message includes the first PDU number. The first PDU number is configured for the terminal 50 to determine legality of the target evolved Node B 60.

The embodiment provides the system 70 for re-establishing the radio resource(s). The terminal 50 compares, in a process for re-establishing the radio resource(s), historical records when the terminal processes a service and historical records when the evolved Node B processes a service corresponding to the service processed by the terminal, thereby determining the legality of the target evolved Node B 60 which performs re-establishing of the radio resource(s) with the terminal 50. Not only may resource consumption in encryption and decryption of transmitted data be avoided, but also security of the IMS terminal in the process for re-establishing the radio resource(s) is improved.

The sending unit, receiving unit, comparison unit and determination unit in the terminal provided by the embodiments of the disclosure may all be implemented by a processor in the terminal. The receiving module, acquisition module and sending module in the target evolved Node B provided by the embodiments of the disclosure may all be implemented by a processor in the target evolved Node B. Of course, specific logical circuits may also be adopted for implementation. In processes of specific embodiments, the processor may be a Central Processing Unit (CPU), a Micro Processing Unit (MPU), a Digital Signal Processor (DSP), Field Programmable Gate Array (FPGA) or the like.

In the embodiment of the disclosure, if the method for re-establishing radio resource(s) applied to the target evolved Node B or the terminal is implemented in form of software function module and sold or used as an independent product, the method for re-establishing radio resource(s) applied to the target evolved Node B or the terminal may also be stored in a computer-readable storage medium. Based on such an understanding, the technical solutions of the embodiment of the disclosure substantially or parts contributing to a conventional art may be embodied in form of software product. The computer software product is stored in a storage medium, including a plurality of instructions arranged to enable a piece of computer apparatus (which may be a personal computer, a server, network apparatus or the like) to perform all or part of the methods in each embodiments of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure further provide a computer-readable storage medium having stored computer-executable instructions for executing a method for re-establishing radio resource(s) applied to a target evolved Node B provided by various embodiments of the disclosure or a method for re-establishing radio resource(s) applied to a terminal provided by various embodiments of the disclosure.

Those skilled in the art should know that the embodiment of the disclosure may be provided as a method, a system or a computer program product. Therefore, the disclosure may adopt a form of hardware embodiment, software embodiment and combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, apparatus (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing apparatus to generate a machine, so that a device for realizing a function specified in one flow or more flows in the flowcharts and/or one block or more blocks in the block diagrams is generated by the instructions executed through the computer or the processor of the other programmable data processing apparatus.

These computer program instructions may also be stored in a computer-readable memory capable of guiding the computer or the other programmable data processing apparatus to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing apparatus, so that a series of operating steps are executed on the computer or the other programmable data processing apparatus to generate processing implemented by the computer, and steps for realizing the function specified in one flow or many flows in the flowcharts and/or one block or many blocks in the block diagrams are provided by the instructions executed on the computer or the other programmable data processing apparatus.

The above is only the preferred embodiment of the disclosure and not intended to limit the scope of protection of the disclosure.

INDUSTRIAL APPLICABILITY

In the embodiments of the disclosure, when the terminal triggers re-establishing of the radio resource(s), the request indication message is sent. The terminal receives the response message sent by the target evolved Node B. The response message includes the first PDU number. The terminal compares the second PDU number which is locally maintained with the first PDU number to acquire the difference value between the second PDU number and the first PDU number. When the difference value does not exceed the preset threshold value, the terminal determines that the target evolved Node B is a legal evolved Node B, and the terminal implements re-establishing of the radio resource(s) between the terminal and the target evolved Node B. In such a manner, the terminal compares, in the process for re-establishing the radio resource(s), the historical records when the terminal processes a service and the historical records when the evolved Node B processes the service corresponding to the service processed by the terminal, thereby determining the legality of the evolved Node B which performs re-establishing of the radio resource(s) with the terminal. Not only may resource consumption in encryption and decryption of the transmitted data be avoided, but also the security of the IMS terminal in the process for re-establishing the radio resource(s) is improved.

What is claimed is:

1. A method for re-establishing radio resource(s), comprising:
when a terminal triggers re-establishing of the radio resource(s), sending a request indication message, wherein the request indication message is arranged to request for acquiring a first Packet Data Unit (PDU) number, which is recorded by a target evolved Node B until the request indication message is received, of PDUs which have been transmitted between the terminal and the target evolved Node B;
receiving, by the terminal, a response message sent by the target evolved Node B, wherein the response message carries the first PDU number;
comparing, by the terminal, a second PDU number, which is locally maintained, with the first PDU number to acquire a difference value between the second PDU number and the first PDU number; and
when the difference value does not exceed a preset threshold value, determining, by the terminal, that the target evolved Node B is a legal evolved Node B, and implementing, by the terminal, re-establishing of the radio resource(s) between the terminal and the target evolved Node B, wherein the second PDU number is a second PDU number, which is recorded by the terminal until the response message is received, of PDUs which have been transmitted between the terminal and the target evolved Node B.

2. The method according to claim 1, further comprising:
when the difference value between the second PDU number and the first PDU number is larger than the preset threshold value, determining, by the terminal, that the target evolved Node B is an illegal evolved Node B, and not searching for, by the terminal, a frequency point of a frequency band where the illegal evolved Node B is located for a preset time period.

3. The method according to claim 2, wherein the preset threshold value is a product of a data transmission rate V when the terminal transmits the request indication message and a time period $\Delta T$ from time when the request indication message is sent by the terminal to time when the response message is received by the terminal.

4. The method according to claim 1, wherein the first PDU number comprises a first uplink PDU number and a first downlink PDU number, wherein the first uplink PDU number is a number of PDUs, which have been transmitted by the terminal and have been received via at least one radio bearer between the target evolved Node B and the terminal, and the first downlink PDU number is a number of PDUs, which have been transmitted to the terminal via the at least one radio bearer between the target evolved Node B and the terminal; and
the second PDU number comprises a second uplink PDU number and a second downlink PDU number, wherein the second uplink PDU number is a number of PDUs, which have been transmitted to the target evolved Node B via the at least one radio bearer between the terminal and the target evolved Node B, and the second downlink PDU number is a number of PDUs, which have been transmitted by the target evolved Node B and have been received via the at least one radio bearer between the terminal and the target evolved Node B.

5. The method according to claim 4, wherein the difference value between the second PDU number and the first PDU number comprises at least one of:
a difference value between the second downlink PDU number and the first downlink PDU number, or a difference value between the second uplink PDU number and the first uplink PDU number.

6. The method according to claim 4, wherein the preset threshold value is a product of a data transmission rate V when the terminal transmits the request indication message and a time period $\Delta T$ from time when the request indication message is sent by the terminal to time when the response message is received by the terminal.

7. The method according to claim 1, wherein the preset threshold value is a product of a data transmission rate V when the terminal transmits the request indication message and a time period $\Delta T$ from time when the request indication message is sent by the terminal to time when the response message is received by the terminal.

8. A non-transitory computer storage medium having stored computer-executable instructions for executing the method for re-establishing radio resource(s) according to claim 1.

9. A method for re-establishing radio resource(s), comprising:
receiving, by a target evolved Node B, a request indication message sent by a terminal, wherein the request indication request is configured for the terminal to request for acquiring a first Packet Data Unit (PDU) number, which is recorded by the target evolved Node B until the request indication message is received, of PDUs which have been transmitted between the terminal and the target evolved Node B;

acquiring, by the target evolved Node B, the first PDU number recorded until the request indication message is received according to the request indication message; and sending, by the target evolved Node B, a response message to the terminal, wherein the response message carries the first PDU number, and the first PDU number is configured for the terminal to determine legality of the target evolved Node B.

10. The method according to claim 9, wherein the first PDU number comprises a first uplink PDU number and a first downlink PDU number, wherein the first uplink PDU number is a number of PDUs, which have been transmitted by the terminal and have been received via at least one radio bearer between the target evolved Node B and the terminal, and the first downlink PDU number is a number of PDUs, which have been transmitted to the terminal via the at least one radio bearer between the target evolved Node B and the terminal.

11. A non-transitory computer storage medium having stored computer-executable instructions for executing the method for re-establishing radio resource(s) according to claim 9.

12. A terminal, comprising:

one or more processors executing computer readable instructions for a plurality of units comprising a sending unit, a receiving unit, a comparison unit and a determination unit, wherein:

the sending unit is arranged to, when the terminal triggers re-establishing of a radio resource(s), send a request indication message, wherein the request indication message is arranged to request for acquiring a first Packet Data Unit (PDU) number, which is recorded by a target evolved Node B until the request indication message is received, of PDUs which have been transmitted between the terminal and the target evolved Node B;

the receiving unit is arranged to receive a response message sent by the target evolved Node B, wherein the response message carries the first PDU number;

the comparison unit is arranged to compare a second PDU number, which is locally maintained, with the first PDU number received by the receiving unit to acquire a difference value between the second PDU number and the first PDU number, and transmit the difference value to the determination unit; and the determination unit is arranged to, when the difference value does not exceed a preset threshold value, determine that the target evolved Node B is a legal evolved Node B, and implement re-establishing of the radio resource(s) between the terminal and the target evolved Node B, wherein the second PDU number is a second PDU number, which is recorded by the terminal until the response message is received, of PDUs which have been transmitted between the terminal and the target evolved Node B.

13. The terminal according to claim 12, wherein the determination unit is further arranged to, when the difference value is larger than the preset threshold value, determine that the target evolved Node B is an illegal evolved Node B, and not search for a frequency point of a frequency band where the illegal evolved Node B is located for a preset time period.

14. The terminal according to claim 6, wherein the preset threshold value is a product of a data transmission rate V when the sending unit sends the request indication message and a time period Δ T from time when the request indication message is sent by the sending unit to time when the response message is received by the receiving unit.

15. The terminal according to claim 12, wherein the first PDU number comprises a first uplink PDU number and a first downlink PDU number, wherein the first uplink PDU number is a number of PDUs, which have been transmitted by the terminal and have been received via at least one radio bearer between the target evolved Node B and the terminal, and the first downlink PDU number is a number of PDUs, which have been transmitted to the terminal via the at least one radio bearer between the target evolved Node B and the terminal; and the second PDU number comprises a second uplink PDU number and a second downlink PDU number, wherein the second uplink PDU number is a number of PDUs, which have been transmitted to the target evolved Node B via the at least one radio bearer between the terminal and the target evolved Node B, and the second downlink PDU number is a number of PDUs, which have been transmitted by the target evolved Node B and have been received via the at least one radio bearer between the terminal and the target evolved Node B.

16. The terminal according to claim 15, wherein the difference value between the second PDU number and the first PDU number comprises at least one of:

a difference value between the second downlink PDU number and the first downlink PDU number, or a difference value between the second uplink PDU number and the first uplink PDU number.

17. The terminal according to claim 15, wherein the preset threshold value is a product of a data transmission rate V when the sending unit sends the request indication message and a time period Δ T from time when the request indication message is sent by the sending unit to time when the response message is received by the receiving unit.

18. The terminal according to claim 12, wherein the preset threshold value is a product of a data transmission rate V when the sending unit sends the request indication message and a time period Δ T from time when the request indication message is sent by the sending unit to time when the response message is received by the receiving unit.

19. A target evolved Node B, comprising:

one or more processors executing computer readable instructions for a plurality of units comprising a receiving module, an acquisition module and a sending module, wherein:

the receiving module is arranged to receive a request indication message sent by a terminal, wherein the request indication request is configured for the terminal to request for acquiring a first Packet Data Unit (PDU) number, which is recorded by the target evolved Node B until the request indication message is received, of PDUs which have been transmitted between the terminal and the target evolved Node B;

the acquisition module is arranged to acquire the first PDU number recorded until the request indication message is received according to the request indication message; and the sending module is arranged to send a response message to the terminal, wherein the response message carries the first PDU number, and the first PDU number is configured for the terminal to determine legality of the target evolved Node B.

20. The target evolved Node B according to claim 19, wherein the first PDU number comprises a first uplink PDU number and a first downlink PDU number, wherein the first uplink PDU number is a number of PDUs, which have been transmitted by the terminal and have been received via at least one radio bearer between the target evolved Node B and the terminal, and the first downlink PDU number is a number of PDUs, which have been transmitted to the terminal via the at least one radio bearer between the target evolved Node B and the terminal.

* * * * *